(12) United States Patent
Tanie et al.

(10) Patent No.: US 10,804,765 B2
(45) Date of Patent: Oct. 13, 2020

(54) ELECTROMECHANICAL INTEGRAL MOTOR

(71) Applicant: HITACHI, LTD., Chiyoda-ku, Tokyo (JP)

(72) Inventors: Hisashi Tanie, Tokyo (JP); Yoshitaka Iwaji, Tokyo (JP); Yuji Enomoto, Tokyo (JP); Hirooki Tokoi, Tokyo (JP); Takayoshi Nakamura, Tokyo (JP); Naoki Sakurai, Tokyo (JP); Fusao Houjyou, Tokyo (JP); Kohei Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 52 days.

(21) Appl. No.: 15/779,296

(22) PCT Filed: Nov. 4, 2016

(86) PCT No.: PCT/JP2016/082730
§ 371 (c)(1),
(2) Date: May 25, 2018

(87) PCT Pub. No.: WO2017/090403
PCT Pub. Date: Jun. 1, 2017

(65) Prior Publication Data
US 2018/0358863 A1    Dec. 13, 2018

(30) Foreign Application Priority Data
Nov. 27, 2015   (JP) .................................. 2015-231219

(51) Int. Cl.
*H02K 5/24* (2006.01)
*H02K 5/18* (2006.01)
(Continued)

(52) U.S. Cl.
CPC .............. *H02K 5/24* (2013.01); *H02K 1/2766* (2013.01); *H02K 1/2793* (2013.01); *H02K 5/18* (2013.01);
(Continued)

(58) Field of Classification Search
CPC ........ H02K 11/25; H02K 11/33; H02K 11/38; H02K 5/18; H02K 5/24; H02K 1/2766; H02K 1/2793
(Continued)

(56) References Cited

U.S. PATENT DOCUMENTS

2006/0025249 A1    2/2006  Giannetti et al.
2007/0103101 A1*   5/2007  Kikuchi ............... H02K 11/048
                                                      318/140
(Continued)

FOREIGN PATENT DOCUMENTS

JP    H05-061551 U     8/1993
JP    2000-060060 A    2/2000
(Continued)

OTHER PUBLICATIONS

Translation of foreign document JP 2014193075 A (Year: 2014).*
(Continued)

*Primary Examiner* — Alex W Mok
(74) *Attorney, Agent, or Firm* — Foley & Lardner LLP

(57) ABSTRACT

A highly reliable electromechanical integral motor is provided. In the electromechanical integral motor including an axial gap type motor and a power conversion control device, the power conversion control device is mounted on an end bracket portion of the motor. Additionally, a space is provided between the end bracket portion of the motor and the power conversion control device. Further, the end bracket portion of the motor and the power conversion control device are fixed by a plurality of fixing members, and at least
(Continued)

one set of the plurality of fixing members is disposed to be spaced apart from each other.

7 Claims, 13 Drawing Sheets

(51) Int. Cl.
*H02K 11/25* (2016.01)
*H02K 11/33* (2016.01)
*H02K 11/38* (2016.01)
*H02K 1/27* (2006.01)

(52) U.S. Cl.
CPC ............ *H02K 11/33* (2016.01); *H02K 11/38* (2016.01); *H02K 11/25* (2016.01)

(58) Field of Classification Search
USPC .......................................... 310/51
See application file for complete search history.

(56) References Cited

U.S. PATENT DOCUMENTS

| 2009/0045685 | A1* | 2/2009 | Yoon ........................ F16F 15/08 310/51 |
| 2012/0229005 | A1* | 9/2012 | Tominaga ............ B62D 5/0406 310/68 B |
| 2014/0145564 | A1* | 5/2014 | Taniguchi ................ H02K 3/12 310/68 B |
| 2014/0170345 | A1 | 7/2014 | Aoshima et al. |
| 2014/0232217 | A1* | 8/2014 | Miyama .................... H02K 5/20 310/52 |
| 2014/0326530 | A1* | 11/2014 | Asao ..................... B62D 5/0406 180/443 |
| 2014/0339966 | A1* | 11/2014 | Tomizawa ............... H02K 5/22 310/68 D |
| 2015/0001979 | A1 | 1/2015 | Deguchi et al. |
| 2015/0171709 | A1* | 6/2015 | Ito .......................... H02K 5/225 310/52 |
| 2017/0111003 | A1 | 4/2017 | Kikuchi et al. |

FOREIGN PATENT DOCUMENTS

| JP | 2006-217748 A | 8/2006 |
| JP | 2007-013327 A | 1/2007 |
| JP | 2008-180120 A | 8/2008 |
| JP | 2013-068896 A | 4/2013 |
| JP | 2015-012676 A | 7/2013 |
| JP | 2014-193075 A | 10/2014 |
| JP | 2015-012679 A | 1/2015 |

OTHER PUBLICATIONS

International Search Report with English translation and Written Opinion issued in corresponding application No. PCT/JP2016/082730 dated Dec. 6, 2016.

* cited by examiner

GENERAL VIEW

DISPLAY VIEW OTHER THAN COVER 4

CROSS-SECTIONAL VIEW

LOAD SIDE END BRACKET

HOUSING

ANTI-LOAD SIDE END BRACKET

COIL

ROTATING MEMBER

FIXING MEMBER

POWER CONVERSION CONTROL DEVICE

COVER

TARGET STRUCTURE

RADIAL LOAD CONDITION

AXIAL LOAD CONDITION

DEFORMATION MODE BY RADIAL LOAD

EVALUATION POSITION

RELATIONSHIP BETWEEN AXIAL DIMENSION AND ACCELERATION BY RADIAL LOAD

DEFORMATION MODE BY AXIAL LOAD

EVALUATION POSITION

RELATIONSHIP BETWEEN AXIAL DIMENSION AND ACCELERATION BY AXIAL LOAD

CROSS-SECTIONAL VIEW

GENERAL VIEW

DISPLAY VIEW OTHER THAN COVER 4

GENERAL VIEW

DISPLAY VIEW OTHER THAN COVER 4

GENERAL VIEW

CROSS-SECTIONAL VIEW

POWER CONVERSION CONTROL DEVICE AND SUBSTRATE

ELECTROMECHANICAL INTEGRAL MOTOR

TECHNICAL FIELD

The present invention relates to an electromechanical integral motor including a motor and a power conversion control device.

BACKGROUND ART

In recent years, energy saving or downsizing has been demanded for products, such as industrial equipment, household electric appliances, and automobile parts, which use a motor. In order to achieve the energy saving or downsizing, it is effective to use a high-efficiency motor and integrate a motor with a power conversion control device that drives the motor. However, in the structure in which the motor and the power conversion control device are integrated, there is a need to protect the power conversion control device from heat or vibration generated by driving the motor to secure reliability of the power conversion control device.

PTL 1 discloses a technique of providing a motor-driven compressor with a built-in inverter that can efficiently cool the inverter without increasing a size of a machine container and can be driven without reducing its reliability and performance even under high temperature and intensive vibration when being directly mounted on an engine or the like.

PTL 2 discloses, as a technique of improving efficiency of a motor, a technique of an axial gap type dynamoelectric machine having a structure in which a pair of disk-shaped rotors is disposed to be opposite to each other in an axial direction of a rotating shaft and a stator is interposed between the rotors at a predetermined gap.

PTL 3 discloses a technology of integrating an axial gap type motor with an inverter.

CITATION LIST

Patent Literature

PTL 1: JP 2007-13327 B
PTL 2: JP 2015-012676 A
PTL 3: JP 2013-68896 A

SUMMARY OF INVENTION

Technical Problem

In an axial gap type motor, since a magnet and a coil are disposed in an axial direction of a rotating shaft, the coil and the magnet attract each other in the axial direction at the time of the rotation, such that peculiar vibration of the axial gap type motor is generated. An object of the present invention is to provide a highly reliable electromechanical integral motor (including a motor and a power conversion control device) by protecting the power conversion control device from peculiar vibration of an axial gap type motor and protecting the power conversion control device from heat generated by driving of the motor in the structure in which the axial gap type motor and the power conversion control device are integrated.

Solution to Problem

As an example thereof, the present invention provides an electromechanical integral motor including an axial gap type motor and a power conversion control device, in which the power conversion control device is mounted on an end bracket portion of the motor, a space is installed between the end bracket portion of the motor and the power conversion control device, the end bracket portion of the motor and the power conversion control device are fixed by a plurality of fixing members, and at least one set of the plurality of fixing members is disposed to be spaced apart from each other.

Advantageous Effects of Invention

According to the present invention, it is possible to provide a highly reliable electromechanical integral motor.

DESCRIPTION OF EMBODIMENTS

Hereinafter, embodiments are described with reference to the drawings.

First Embodiment

Figure 1A:
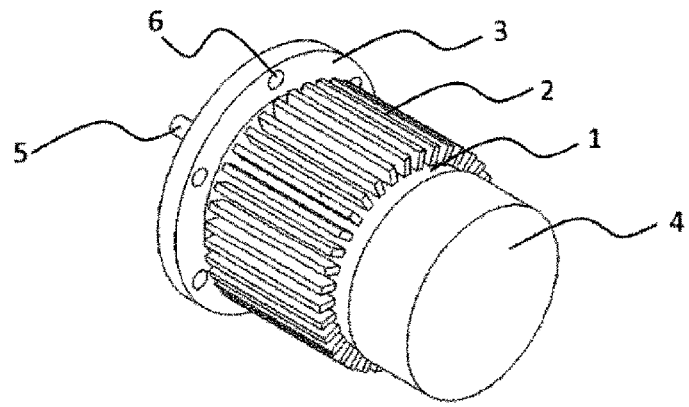
FIG. 1 is a general view and a cross-sectional view for explaining an electromechanical integral motor according to a first embodiment.
Figure 1B:
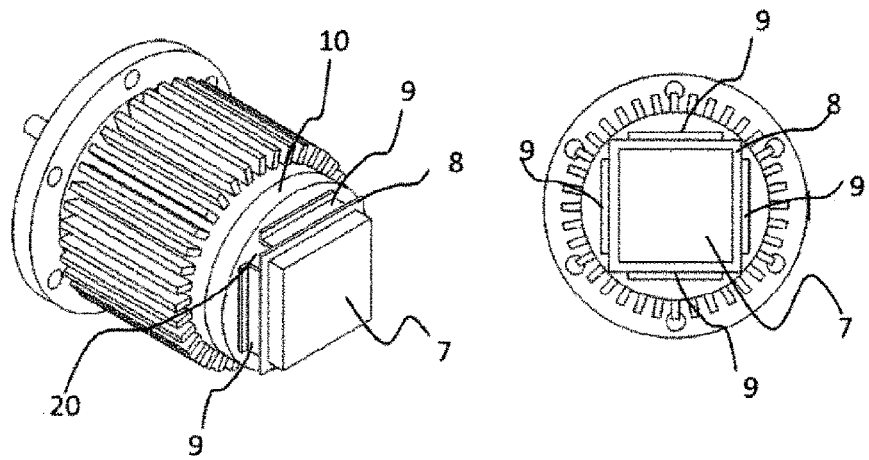

FIG. 1 shows an electromechanical integral motor according to a first embodiment of the present invention.

FIG. 1(a) shows a general view. An appearance is configured of a housing 1 made of an aluminum alloy and having a heat radiating fin 2 installed on a surface thereof, a load side end bracket 3 made of stainless steel and provided with a bolt hole 6 for fixing a motor, and a cover 4 made of aluminum, in which a shaft 5 protrudes from the load side end bracket 3. The motor is fixed to a device by using the bolt hole 6 for fixing the motor, and functions as a motor by a rotation of the shaft 5. Heat generated by the operation of the motor is dissipated to the outside air by the heat radiating fin 2, and the temperature rise during the operation is reduced.

FIG. 1(*b*) is a display view other than the cover 4. The motor is configured to fix an anti-load side end bracket 10 to the housing 1 in the cover 4. A substrate 8 on which a power conversion control device 7 is mounted is disposed on the surface of the anti-load side end bracket 10 and the substrate 8 is fixed to the anti-load side end bracket 10 by a fixing member 9. At this time, a plurality of fixing members 9 are present, and the respective fixing members 9 are disposed to be spaced apart from each other. For this reason, one of the features of the first embodiment is that a space 19 surrounded by the anti-load side end bracket 10, the substrate 8, and the fixing member 9 has air permeability without being hermetically sealed. In the first embodiment, an epoxy resin is used for the fixing member 9. One of the features of the first embodiment is that the fixing member 9 is made of a material having a lower elastic modulus and a larger damping factor than the stainless steel forming the end bracket.

FIG. 1(*c*) shows a cross-sectional view of the electromechanical integral motor according to the first embodiment. A coil 11 is fixed to an inner wall of the housing 1. The shaft 5 is supported by a bearing 14 which is disposed on a central part between the load side end bracket 6 and the anti-load side end bracket 10, and two sheets of magnet supports 13 are fixed to the shaft 5 so that a coil 11 is interposed between the magnet supports 13. The axial gap type motor has a structure in which magnets 12 are disposed on surfaces of the respective magnet supports 13 facing the coil 11. In an area surrounded by the anti-load side end bracket 10 and the cover 4, the substrate 8 on which the power conversion control device 7 is mounted is fixed by the fixing member 9. In this structure, the feature of the first embodiment is that a distance L2 between the fixing members 9 is larger than an outer dimension L1 of the power conversion control device 7.

FIG. 2 individually shows the members configuring the electromechanical integral motor of the first embodiment. As shown in FIG. 2(*a*), the load side end bracket 3 has a substantially disk shape, and the plurality of bolt holes 6 for fixing the motor are provided on an outer circumferential part of the load side end bracket 3 and a recessed part for fixing a bearing 14 is provided on a central part thereof. As shown in FIG. 2(*c*), the housing has a substantially cylindrical shape, and the heat radiating fin 2 is provided on an outer surface of the housing. As shown in FIG. 2(*c*), the anti-load side end bracket 10 has a substantially disk shape having a radius smaller than that of the load side end bracket 3, and a central part thereof is provided with the recessed part for fixing the bearing 14. As shown in FIG. 2(*d*), the coil 11 has a columnar shape in which a hole is formed in a central part of the coil 11 as a whole by combining a plurality of fan-shaped coils. As shown in FIG. 2(*e*), a rotating member has a structure in which the two sheets of magnet supports 13 are fixed to the shaft 5 and the surfaces of the magnet supports 13 are provided with disk-shaped magnets having a hole which is provided at a central part thereof by combining a plurality of magnets on a fan side. As shown in FIG. 2(*f*), according to the first embodiment, there are four fixing members 9, and the four fixing members are disposed so that each of the four fixing members fixes sides of the substrate 8 on which the power conversion control device 7 shown in FIG. 2(*g*) is mounted. As shown in FIG. 2(*h*), the cover is disposed to protect the power conversion control device 7. The electromechanical integral motor of the first embodiment is configured by these members.

Figure 3A:
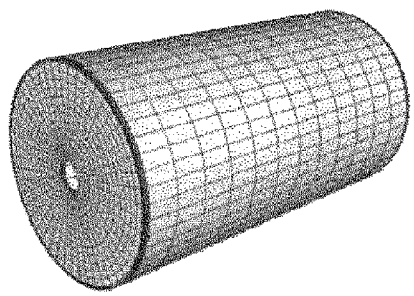
FIG. 3 is a first diagram for explaining an effect of the first embodiment.
Figure 3B:
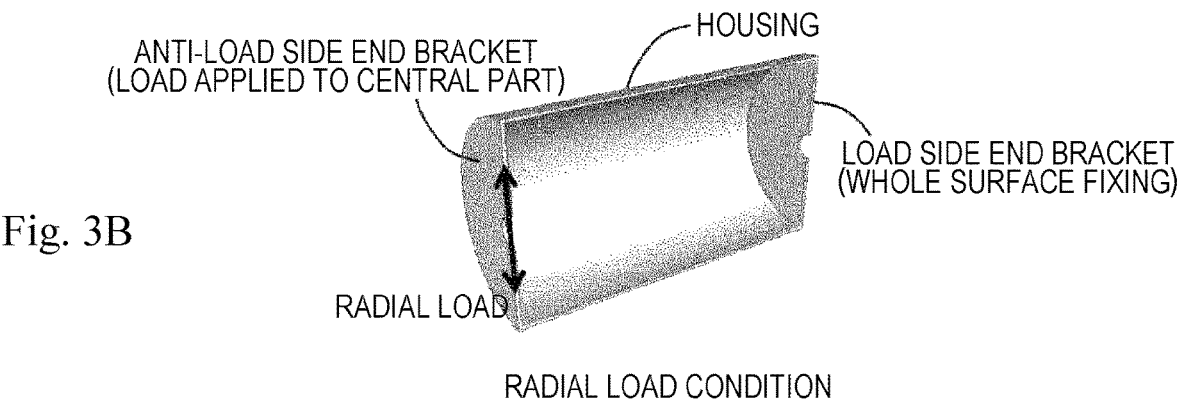
Figure 3C:
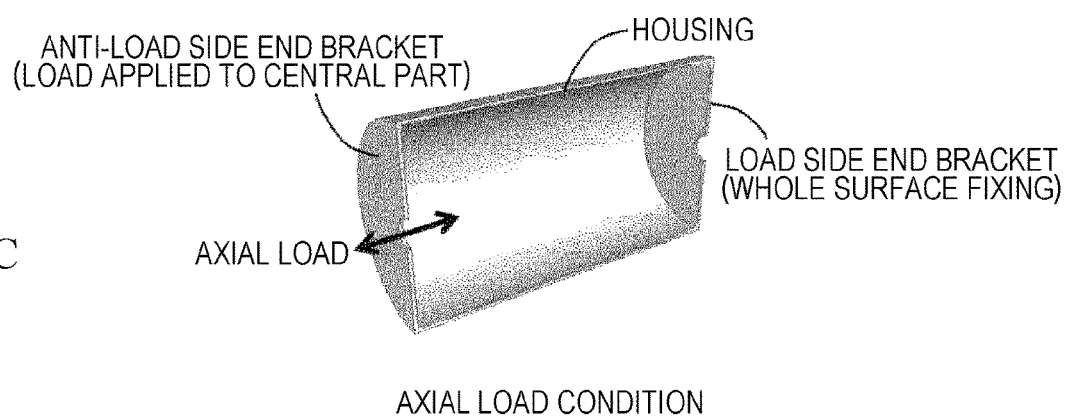

Next, a vibration mode generated when the axial gap type motor rotates is described with reference to FIGS. 3 to 5. An attracting force or a repulsive force is generated between the coil and the magnet when the motor operates. In a cylindrical motor in which the coils and the magnets are disposed in a radial direction, the attracting force and the repulsive force are applied in the radial direction. For this reason, it is considered that a radial load shown in FIG. 3(*b*) is mainly applied to a bearing portion by the operation of the motor and the anti-load side end bracket vibrates by the radial load. Meanwhile, in the axial gap type motor, since the coils and the magnets are disposed in an axial direction, an axial load shown in FIG. 3(*c*) is mainly applied to the bearing portion. A difference between vibration modes of the housing or the end bracket portion of the cylindrical motor and the axial gap type motor due to a difference between the loads on the bearing portion is described with reference to FIGS. 4 and 5.

Figure 4:
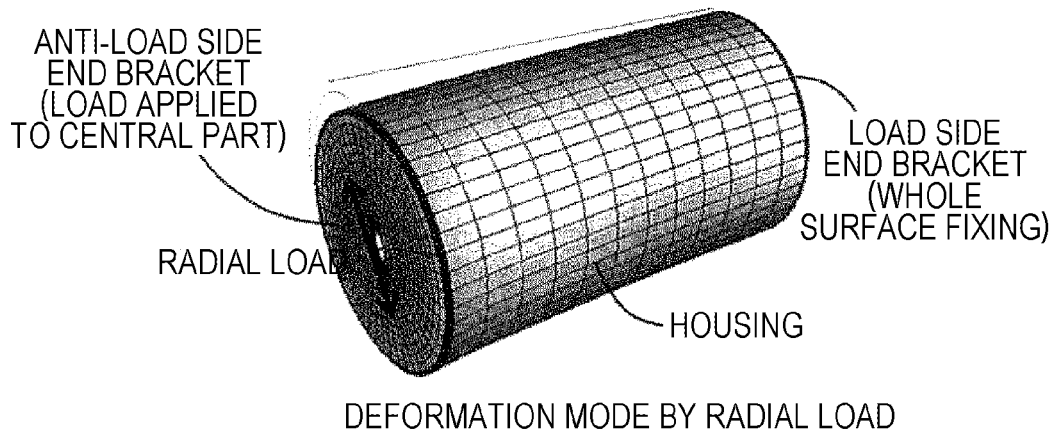
FIG. 4 is a second diagram for explaining the effect of the first embodiment.
Figure 4:
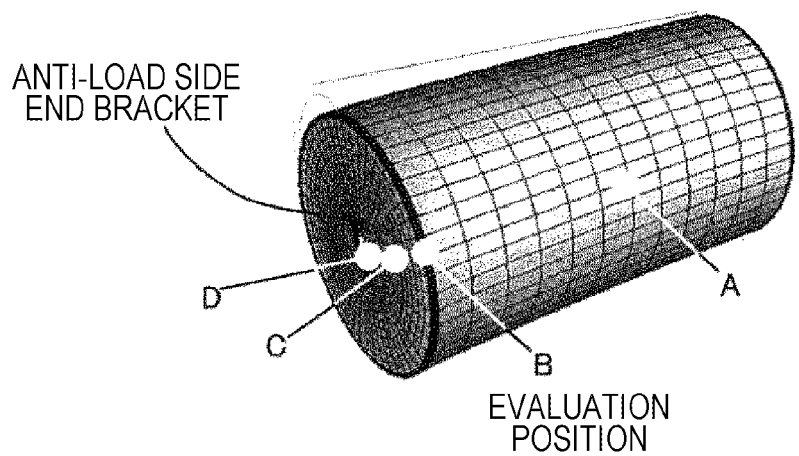
Figure 4:
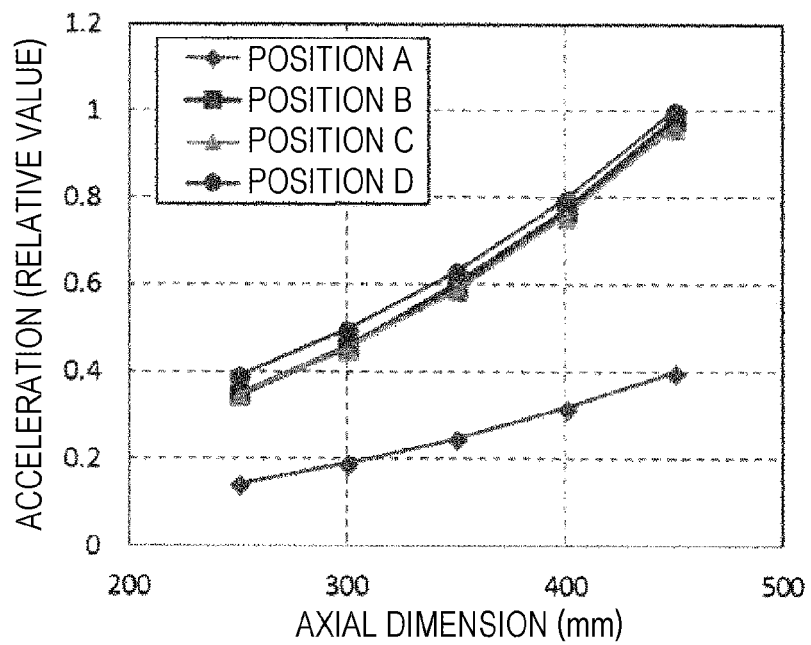

FIG. 4 shows a deformation mode when the radial load is applied to the bearing portion of the anti-load side end bracket while the load side end bracket is fixed. The housing portion undergoes bending deformation by the radial load and the whole of the anti-load side end bracket is deformed in the load direction. An axial midpoint on the surface of the housing portion is defined as position A, an outer circumferential part of the anti-load side end bracket portion is defined as position B, a radial midpoint of the anti-load side end bracket portion is defined as position C, the bearing portion of the anti-load side end bracket portion is defined as position D, and accelerations generated at each point when the radial load is repeatedly applied to the bearing portion of the anti-load side end bracket is shown in a graph. In the graph, a horizontal axis represents an axial dimension of the motor and a vertical axis represents the acceleration, and the acceleration is indicated as a relative value based on the maximum acceleration which is generated under the condition that the largest axial dimension in the current evaluation has a size of 450 mm. It is shown that the accelerations at the positions B, C and D are almost the same and the entire anti-load side end bracket portion is deformed. The position A has a smaller acceleration than the positions B, C, and D. This shows that since the housing portion undergoes the bending deformation, the closer to the load side end bracket which is the fixed portion, the smaller the acceleration becomes. At any position, the smaller the axial radius, the smaller the acceleration becomes. This is because the smaller the axial radius is, the smaller the displacement due to the bending deformation of the housing portion becomes.

Figure 5:
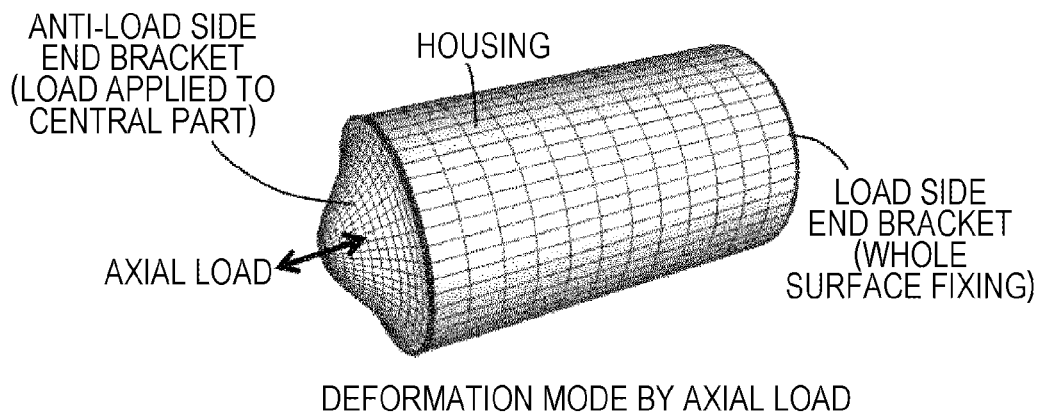
FIG. 5 is a third diagram for explaining the effect of the first embodiment.
Figure 5:
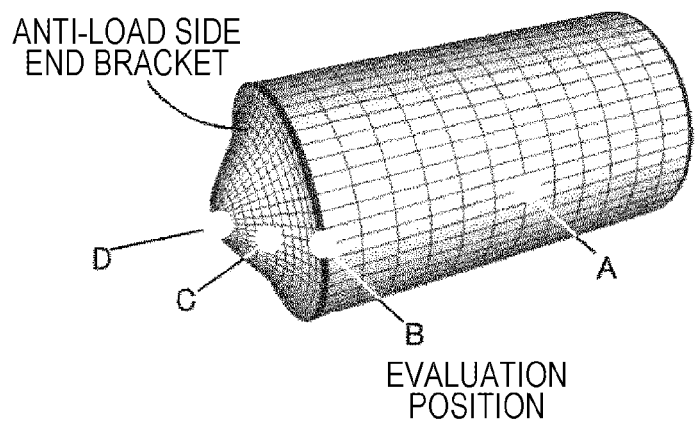
Figure 5:
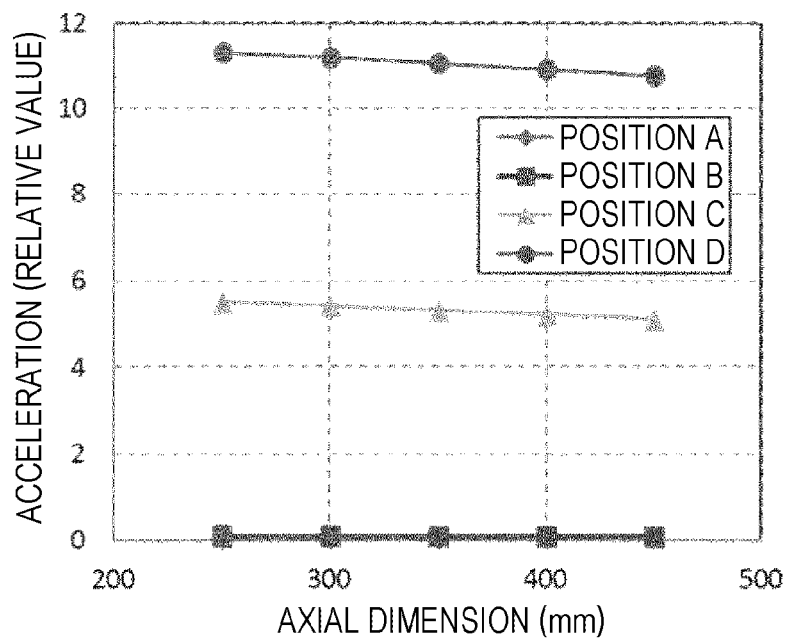

FIG. 5 shows the deformation mode when the axial load is applied to the bearing portion of the anti-load side end bracket while the load side end bracket is fixed. By the axial load, the anti-load side end bracket undergoes a concentric bending deformation in an out-of-plane direction, whereas the deformation of the housing portion is small. Similarly to FIG. 4, the axial midpoint on the surface of the housing portion is defined as the position A, the outer circumferential part of the anti-load side end bracket portion is defined as the position B, the radial midpoint of the anti-load side end bracket portion is defined as the position C, the bearing portion of the anti-load side end bracket portion is defined as the position D, and accelerations generated at each point when the axial load is repeatedly applied to the bearing portion of the anti-load side end bracket are shown in a graph. In the graph, the horizontal axis represents the axial dimension of the motor and the vertical axis represents the acceleration. The acceleration is generated when the load of the same magnitude as the radial load applied in FIG. 4 is applied in the axial direction, and similarly to FIG. 4, the acceleration is indicated as a relative value based on the maximum acceleration which is generated in the radial direction under the condition that the axial dimension has a size of 450 mm. The acceleration is large at the position D, and an acceleration of 10 times or more that when the radial load shown in FIG. 4 is applied is generated. The acceleration at the position C is smaller than that at the position D, and the acceleration generated at the position A or B becomes small by 1 digit or more as compared with when the radial load is applied. This shows that under the condition that the axial load is applied, the anti-load side end bracket undergoes an out-of-plane deformation, whereas the deformation of the housing portion is very small.

Figure 6:
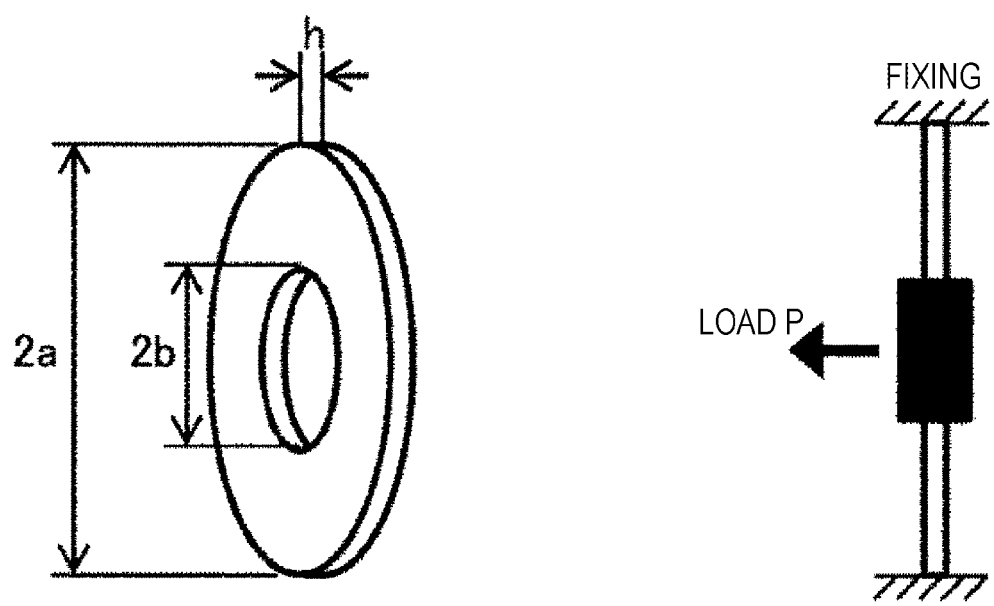
FIG. 6 is a fourth diagram for explaining the effect of the first embodiment.

The deformation of the anti-load side end bracket which undergoes the out-of-plane deformation due to the axial load will be examined in more detail with reference to FIG. 6. As shown in FIG. 6, the anti-load side end bracket is considered as a doughnut-shaped disk of which the fixed end on the inner circumferential part is repeatedly subjected to a load P in the out-of-plane direction while the outer circumferential part of the disk is fixed. If each dimension is set as an outer diameter 2a, an inner diameter 2b, a thickness h, a longitudinal elastic modulus E, and a Poisson's ratio v, an out-of-plane direction displacement u at a position of a distance r from the center is expressed by the following formula.

$$u(r) = \frac{Pa^2}{8\pi D}\left\{(1+A)\left(1-\frac{r^2}{a^2}\right)-\left(B+\frac{r^2}{a^2}\right)\ln\frac{a}{r}\right\}$$ [Mathematical Formula 1]

In the above Formula 1, A and B are each obtained from the following formula.

$$A = \frac{b^2}{a^2-b^2}\ln\frac{a}{b} - \frac{1}{2}$$ [Mathematical Formula 2]

$$B = \frac{2b^2}{a^2-b^2}\ln\frac{a}{b}.$$

In addition, D represents bending rigidity of a plate and is expressed by the following formula.

$$D = \frac{Eh^3}{12(1-v^2)}$$ [Mathematical Formula 3]

From this formula, it can be seen that the displacement u is larger as the position becomes closer to the center with respect to the same load. When the load is repeatedly applied, as the displacement u becomes large, the vibration is getting larger. Therefore, it is desirable that the position is far from the center for the vibration reduction. On the other hand, it can be seen from this formula that the increase in the plate thickness h or the use of a material having a large longitudinal elastic modulus E is effective as a method for reducing the displacement u. However, if the plate thickness h is increased, there is a problem in that the weight or cost of the required material is increased. In addition, since the displacement u is proportional to the longitudinal elastic modulus $E^{-1}$, for example, it is necessary to use a material whose longitudinal elastic modulus is large by 1 digit than that of the stainless steel to reduce the displacement u by 1 digit, and the displacement reducing effects by the change of material is restrictive. It can be seen based on these factors that it is desirable to be positioned far from the center to reduce the displacement u.

In the electromechanical integral motor in which the cylindrical motor and the power conversion control device are integrated, since the radial load is mainly generated, as shown in FIG. 4, the difference in the vibration acting on the power conversion control device due to the rotation of the motor is not so large even if the power conversion control device is mounted at any position on the anti-load side end bracket portion. To reduce the vibration acting on the power conversion control device, it is effective to mount the power conversion control device at a position close to the load side end bracket portion like the position A. However, since the device on which the motor is mounted exists at the position close to the load side end bracket portion, it is difficult to secure a space for mounting the power conversion control device. In order to suppress the vibration of the power conversion control device when the power conversion control device is mounted on the anti-load side end bracket, it is necessary to make the power conversion control device into a vibration prevention structure or use a power conversion control device having high vibration resistance. On the other hand, in the electromechanical integral motor in which the axial gap type motor and the power conversion control device are integrated, the axial load is mainly generated. As shown in FIG. 5, if the power conversion control device is mounted near the bearing portion of the anti-load side end bracket portion, the vibration acting on the power conversion control device is larger by 1 digit or more than when the power conversion control device is mounted on the anti-load side end bracket portion of the cylindrical motor, but if the power conversion control device is mounted near the outer circumferential part of the load side end bracket portion, the vibration can be smaller by 1 digit or more. Therefore, the mounting of the power conversion control device near the outer circumferential part of the load side end bracket portion is effective for the suppression of vibration of the power conversion control device. The axial gap type motor has the feature that the axial dimension can be smaller as compared with the cylindrical motor. As shown in FIG. 4, under the condition that the axial dimension becomes small, the acceleration generated in the anti-load side end bracket portion due to the radial load becomes small. Therefore, in the electromechanical integral motor in which the axial gap type motor and the power conversion control device are integrated, the mounting of the power conversion control device on the load side end bracket portion is effective for the suppression of vibration of the power conversion control device due to the radial load.

Figure 1C:
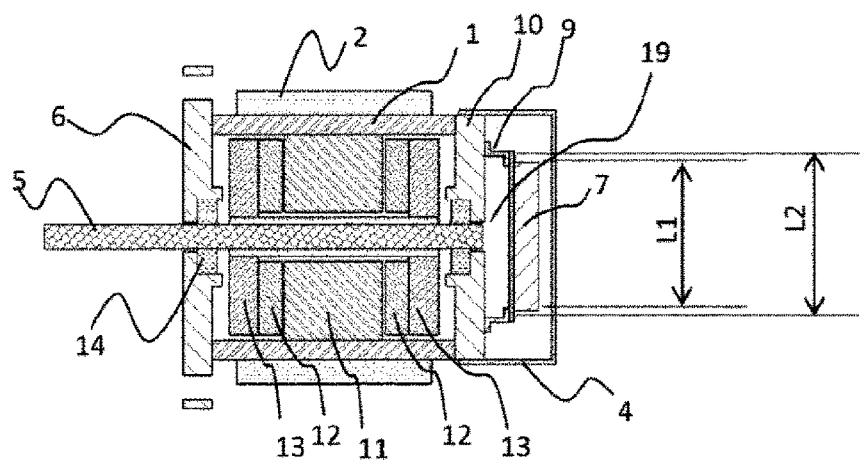
Figure 2A:
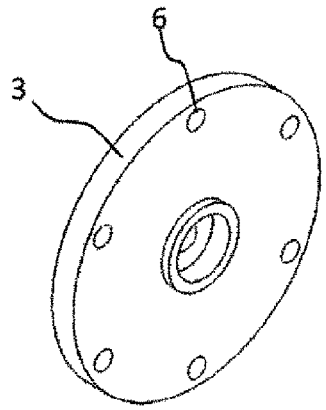
FIG. 2 is a view for explaining a member configuring the electromechanical integral motor according to the first embodiment.
Figure 2B:
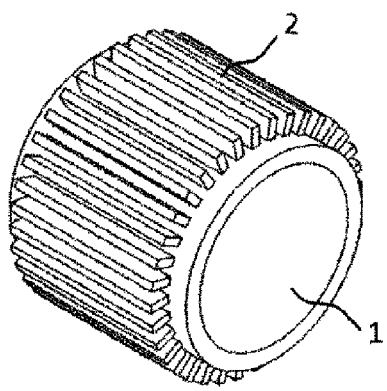
Figure 2C:
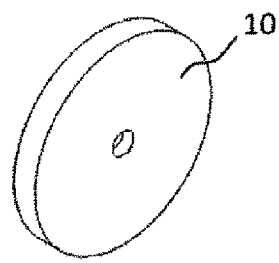
Figure 2D:
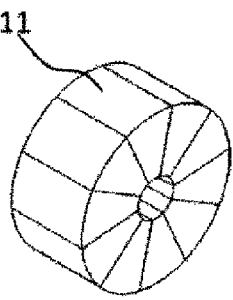
Figure 2E:
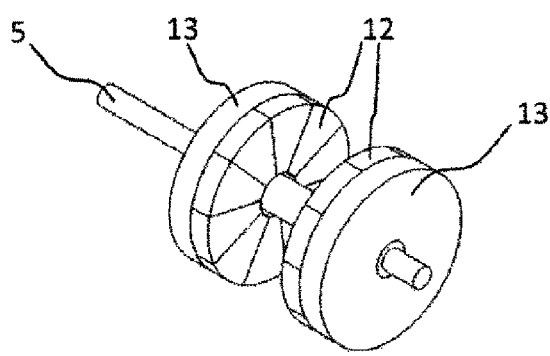
Figure 2F:
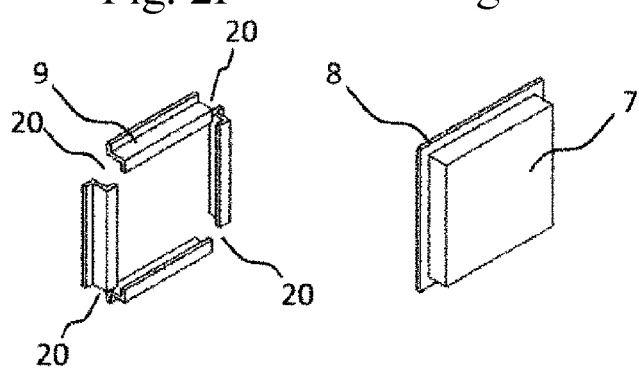
Figure 2G:
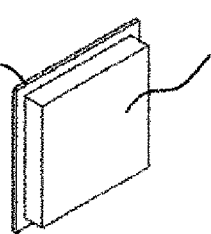
Figure 2H:
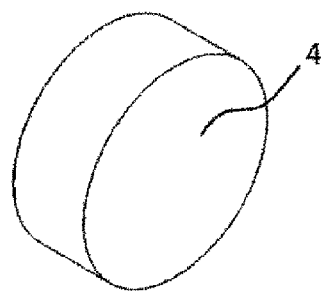

In the electromechanical integral motor according to the first embodiment, the power conversion control device 7 is mounted on the anti-load side end bracket 10 of the axial gap type motor. At this time, as shown in FIG. 1(c), the substrate 8 on which the power conversion control device 7 is mounted is fixed to the anti-load side end bracket 10 by the plurality of fixing members 9, and the fixing members 9 are disposed so that a distance L2 between the fixing members 9 becomes larger than an outer dimension L1 of the power conversion control device 7. That is, the fixing members 9 are disposed so that the distance L2 corresponding to an innermost part of a contacting part of the fixing member 9 with the anti-load side end bracket 10 is larger than the outer dimension L1 of the power conversion control device 7. For this purpose, the fixing member 9 is disposed closer to the outer circumferential part of the motor than the power conversion control device 7, and the vibration at the position at which the fixing member 9 is disposed is small even when the anti-load side end bracket 10 vibrates in the out-of-plane direction by the axial load generated when the axial gap type motor rotates. As a result, it is possible to suppress the vibration acting on the substrate 8 or the power conversion control device 7, which is fixed by the fixing member 9, to be small.

Furthermore, in the first embodiment, an epoxy resin having a lower elastic modulus and a larger damping factor than the stainless steel forming the end bracket is used as the material of the fixing member 9, and even when the vibration of the anti-load side end bracket 10 is transmitted to the fixing member 9, since the vibration can be dampened by the fixing member 9, it is possible to make the vibration acting on the substrate 8 or the power conversion control device 7 smaller. Thanks to these effects, since the substrate 8 or the power conversion control device 7 can be prevented from failing due to vibration, it is possible to provide the highly reliable electromechanical integral motor. In the first embodiment, the epoxy resin is used as the material of the fixing member 9, but a material such as rubber, a composite material of fiber and resin, or the like can also be used. Depending on the elastic modulus or the damping factor of the material used, the ease of processing, or the like, an appropriate material may be selected.

If the temperature of the coil or the like inside the motor rises due to the rotation of the motor, heat is transmitted to the anti-load side end bracket 10, and is dissipated by the heat radiating fin 2 installed on the surface of the housing 1. In the electromechanical integral motor according to the first embodiment, the fixing member 9 is disposed on the outer circumferential part of the anti-load side end bracket 10 close to the heat radiating fin 2 and the space 19 is installed between the anti-load side end bracket 10 and the substrate 8 or the power conversion control device 7. For this reason, even when the temperature of the anti-load side end bracket 10 rises, since the space 19 serves as a heat insulation layer and the heat of the power conversion control device 7 is radiated from the heat radiating fin 2, it is possible to reduce the temperature rise of the substrate 8 or the power conversion control device 7. As a result, it is possible to provide the highly reliable electromechanical integral motor which prevents the malfunction or failure due to the temperature rise of the substrate 8 or the electric power conversion control device 7. Furthermore, in the first embodiment, since the plurality of fixing members 9 are disposed to be spaced apart from each other and there is a gap 20 between the fixing members, the space 19 surrounded by the anti-load side end bracket 10, the substrate 8, and the fixing member 9 becomes a space having air permeability without being hermetically sealed. For this reason, it is possible to prevent the temperature rise of the space 19 by exchanging air, and it is possible to further prevent the malfunction or failure due to the temperature rise of the substrate 8 or the power conversion control device 7.

By these effects, the substrate 8 or the power conversion control device 7 can be protected from the vibration or heat due to the rotation of the motor, thereby providing the highly reliable electromechanical integral motor.

In the first embodiment, although the power conversion control device 7 mounted on the substrate 8 is fixed to the anti-load side end bracket 10 by the fixing member 9, depending on the form of the power conversion control device 7, the power conversion control device 7 may be directly fixed to the anti-load side end bracket 10 by the fixing member 9 without the substrate 8. Even in this case, the power conversion control device 7 is fixed to the anti-load side end bracket 10 by the fixing member 9 so that the distance L2 between the fixing members 9 becomes larger than the outer dimension L1 of the power conversion control device 7, such that the effects of the present invention can be obtained.

Second Embodiment

Figure 7:
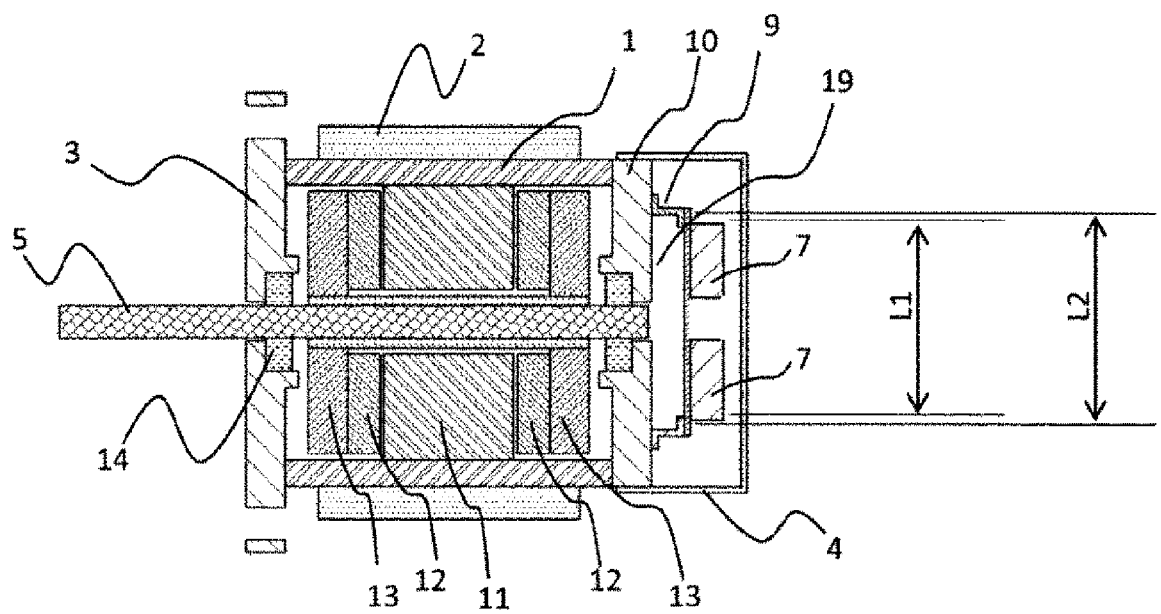
FIG. 7 is a cross-sectional view for explaining an electromechanical integral motor according to a second embodiment.

FIG. 7 shows a cross-sectional view of an electromechanical integral motor according to the second embodiment. The second embodiment is different from the first embodiment in that the power conversion control device 7 mounted on the substrate 8 is configured of a plurality of components. Even in the second embodiment, the substrate 8 or the power conversion control device 7 is fixed to the anti-load side end bracket 10 by the fixing member 9 so that the distance L2 between the fixing members 9 becomes larger than the outer dimension L1 of the power conversion control device 7, such that the effects of the present invention can be obtained. At this time, the outer dimension L1 of the power conversion control device 7 does not indicate the outer dimensions of the individual components configuring the power conversion control device 7, but indicates the outer dimension covering the entire component configuring the power conversion control device 7. By setting L1 in this way, it is possible to protect the entire component configuring the power conversion control device 7 from the vibration generated by the rotation of the motor.

Third Embodiment

Figure 8A:
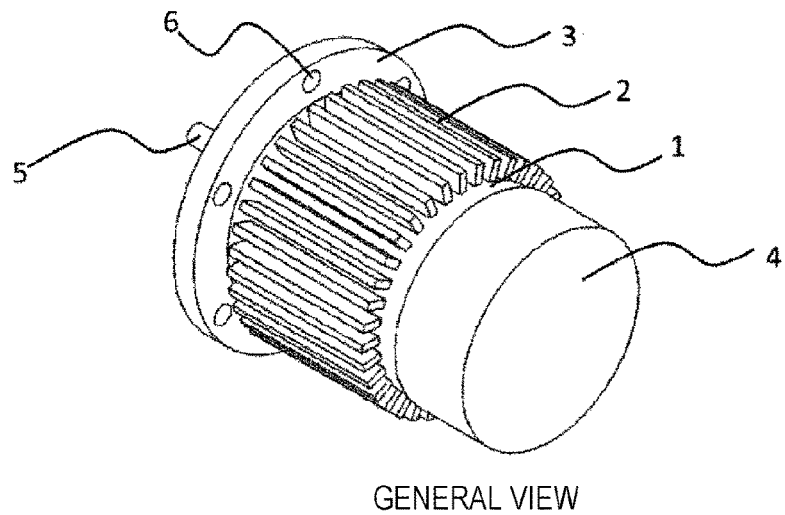
FIG. 8 is a view for explaining an electromechanical integral motor according to a third embodiment.
Figure 8B:
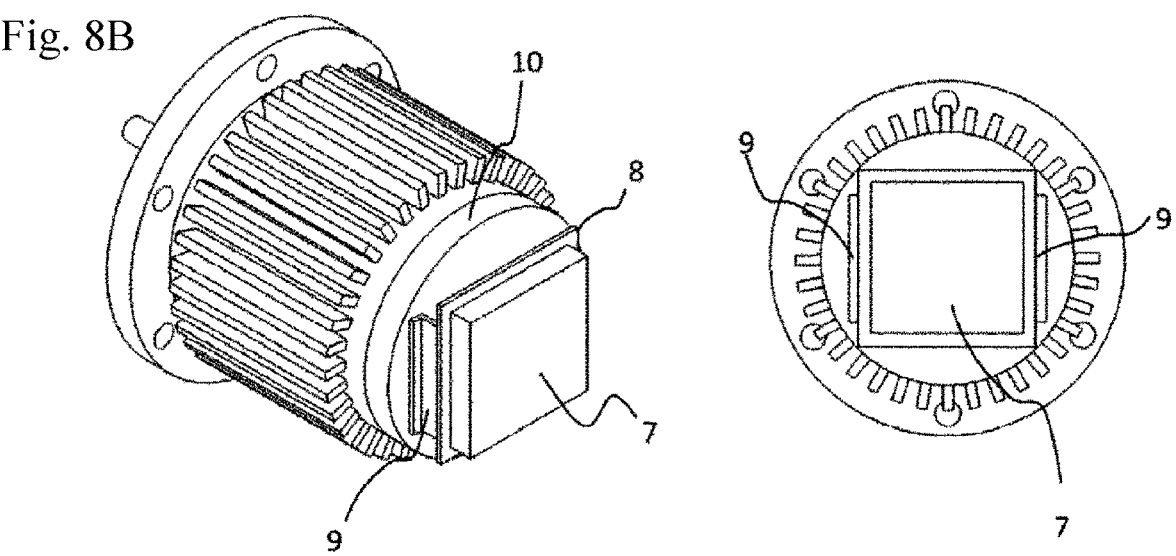

FIG. 8 is a general view of an electromechanical integral motor according to a third embodiment and a view showing components other than the cover 4. The difference between the third embodiment and the first embodiment is in that in the first embodiment, four sides of a quadrangular substrate 8 are fixed by the fixing member 9 but in the third embodiment, only two sides of the quadrangular substrate 8 are fixed. In the electromechanical integral motor applying the present invention, it is possible to reduce the vibration transmitted to the power conversion control device 7 or the substrate 8 by the effect of the present invention. For this reason, it is possible to secure the vibration resistance of the power conversion control device 7 or the substrate 8 without fixing all the sides. In the third embodiment, it is possible to reduce the number of components or the fixed space of the fixing member to be used. In addition, it is possible to further increase the air permeability of the space 19 surrounded by the anti-load side end bracket 10, the substrate 8, and the fixing member 9. Since air flows into the space 19 surrounded by the anti-load side end bracket 10, the substrate 8, and the fixing member 9 by installing a fan or the like on two sides on which the fixing members 9 are not disposed, it is possible to further reduce the temperature rise of the power conversion control device 7 or the substrate 8.

It should be noted that in the third embodiment, the two sides of the quadrangular substrate 8 are fixed, but the substrate 8 need not be a quadrangular shape but may be a polygonal shape or a circular shape. In this case, the substrate is fixed at least at two places by the fixing member 9 and is fixed to the anti-load side end bracket 10 by the fixing member 9 so that the distance L2 between the fixing members 9 is larger than the outer dimension L1 of the power conversion control device 7 at least in any one direction, such that the effects of the present invention can be obtained.

Fourth Embodiment

Figure 9:
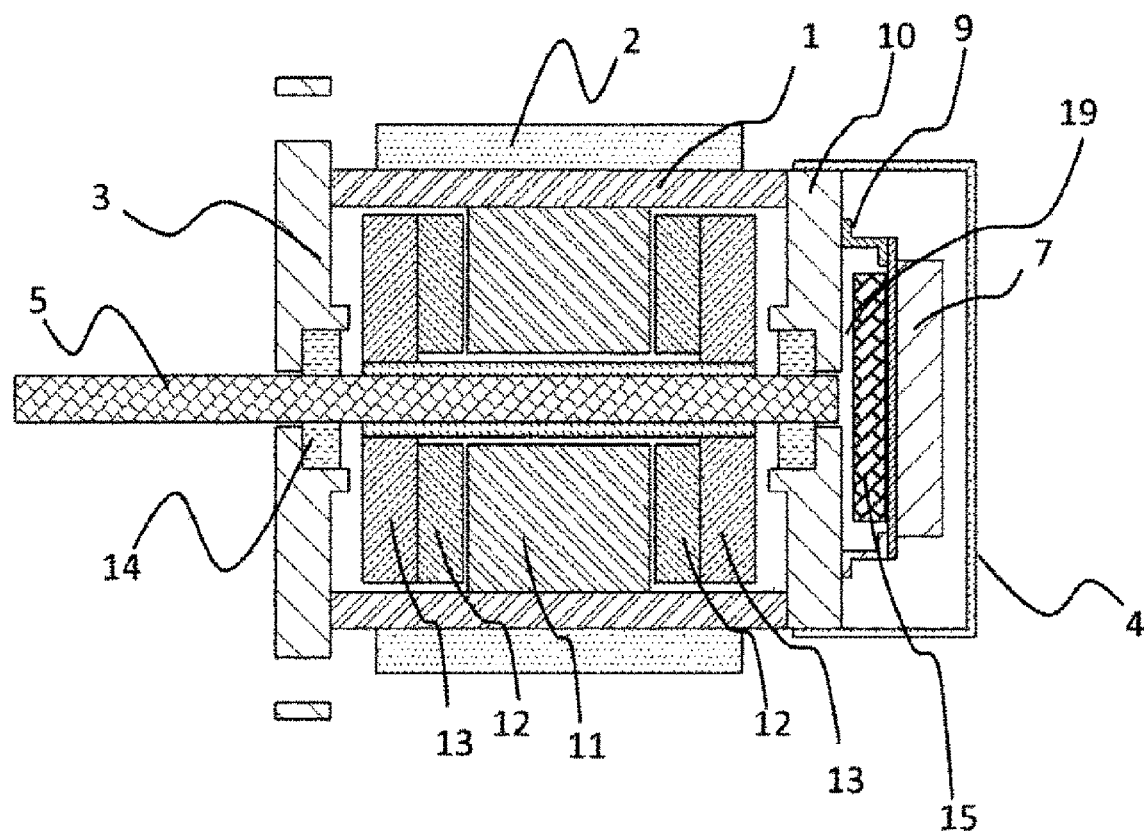
FIG. 9 is a cross-sectional view for explaining an electromechanical integral motor according to a fourth embodiment.

FIG. 9 shows a cross-sectional view of an electromechanical integral motor according to a fourth embodiment. The fourth embodiment is different from the first embodiment in that the heat radiating fin 15 is disposed on the side facing the anti-load side end bracket 10 of the substrate 8. In the fourth embodiment, as the heat radiating fin 15, a fin made of extruded aluminum was used. The space 19 is installed between the heat radiating fins 15 and the anti-load side end bracket 10. When the motor rotates, the power conversion control device 7 is operated to emit heat. In the fourth embodiment, since the heat generated from the power conversion control device 7 can be efficiently radiated by installing the heat radiating fin 15, it is possible to further prevent the temperature of the power conversion control device 7 from rising. At this time, since the space 19 is installed between the heat radiating fin 15 and the anti-load side end bracket 10, even when the temperature of the anti-load side end bracket 10 rises due to the rotation of the motor, the space 19 is operated as an insulating layer to be able to prevent the transmission of the heat from the anti-load side end bracket 10 to the heat radiating fin 15. It should be noted that since air flows into the heat radiating fin 15 by the fan or the like, the effect of the heat radiating fin 15 can be further increased.

Fifth Embodiment

Figure 10A:
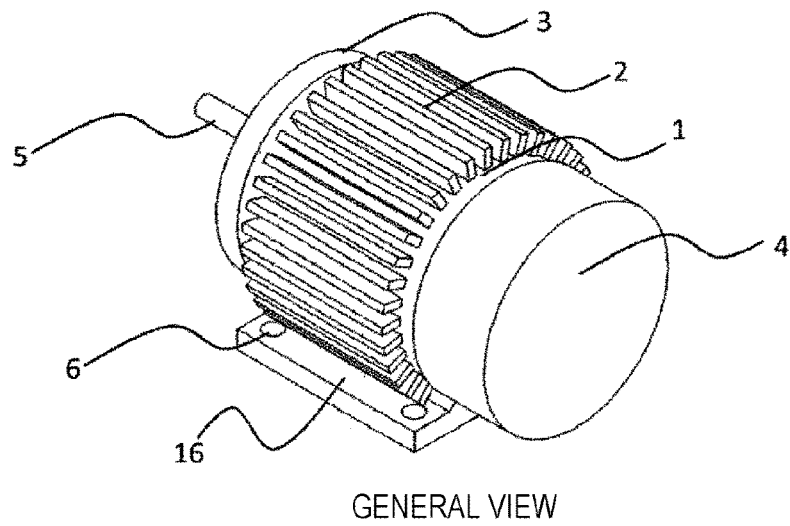
FIG. 10 is a view for explaining an electromechanical integral motor according to a fifth embodiment.
Figure 10B:
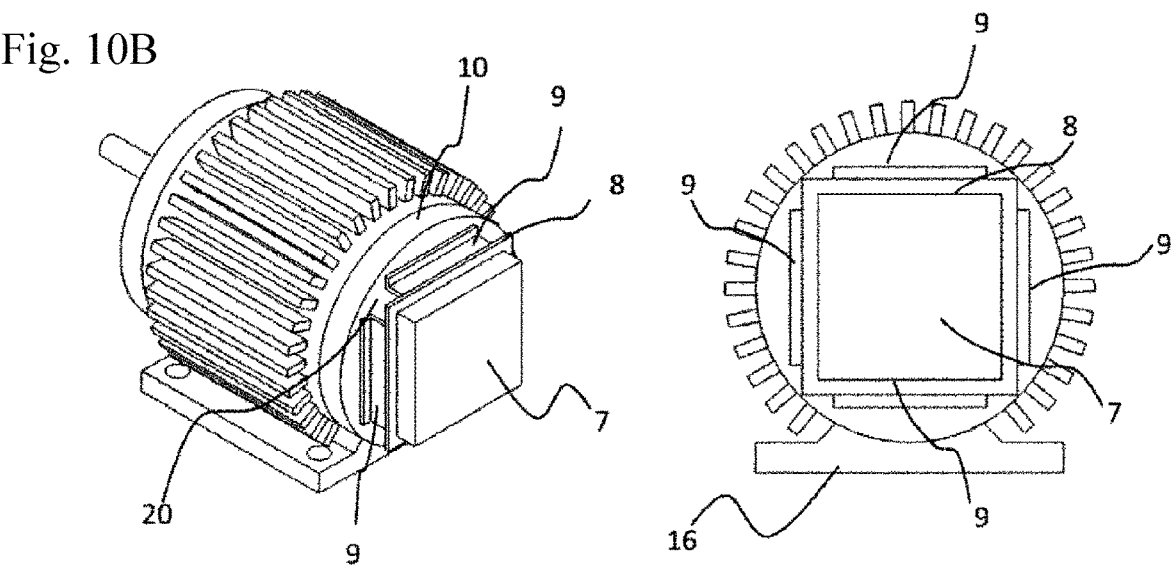

FIG. 10 shows a general view of an electromechanical integral motor according to a fifth embodiment and is a view showing components other than a cover. The difference between the fifth embodiment and the first embodiment is that in the first embodiment, the bolt hole 6 for fixing the motor is installed on the load side end bracket 3, whereas in the fifth embodiment, a leg 16 for fixing the motor is installed at a lower part of the housing 1 and the leg 16 for fixing the motor is provided with the bolt hole 6 for fixing the motor. In the fifth embodiment, the motor can be directly fixed to a floor or the like. Furthermore, in the fifth embodiment, even when the radial load is applied to the anti-load side end bracket 10 due to an unbalance or the like of a weight of a rotating body, since the bending deformation of the housing portion shown in FIG. 4 can be restrained by the leg 16 for fixing the motor, it is possible to further reduce the vibration of the anti-load side end bracket 10. As a result, it is possible to further reduce even the vibration of the power conversion control device 7 or the substrate 8 which is mounted on the anti-load side end bracket 10. It should be noted that since the deformation in the out-of-plane direction of the anti-load side end bracket 10 occurs due to the axial load even when a part of the housing 1 is fixed as in the fifth embodiment, it is still effective for the vibration reduction of the power conversion control device 7 or the substrate 8 by disposing the fixing member 9 on the outer circumferential part thereof while the distance between the fixing members 9 is secured to be larger than the outer dimension of the power conversion control device 7.

Sixth Embodiment

Figure 11:
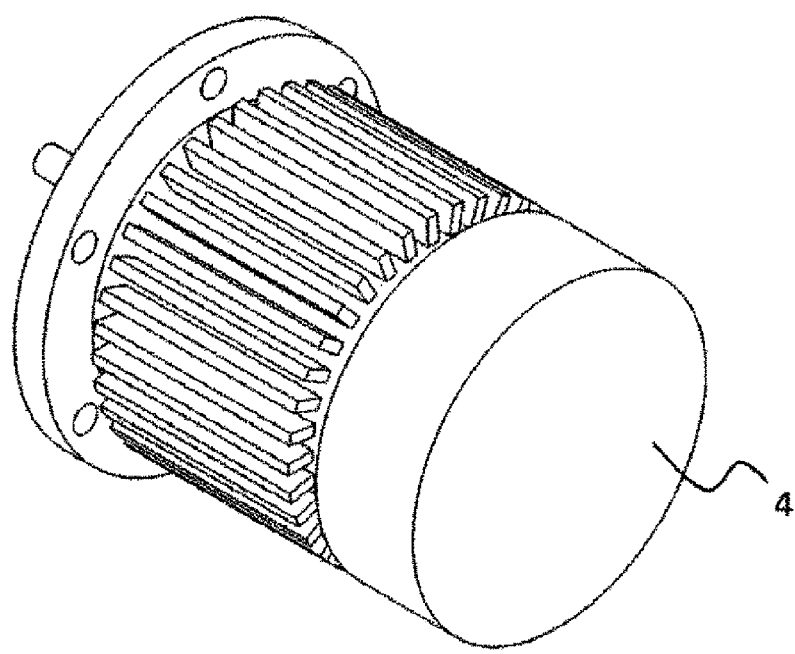
FIG. 11 is a view for explaining an electromechanical integral motor according to a sixth embodiment.
Figure 11:
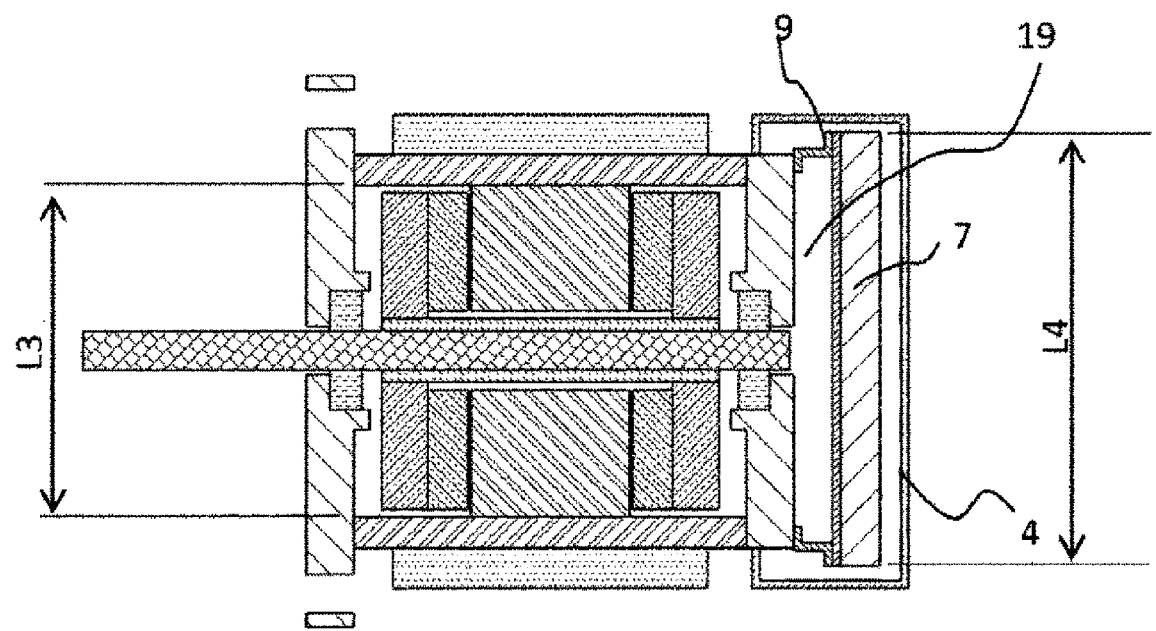

FIG. 11 shows a general view and a cross-sectional view of an electromechanical integral motor according to a sixth embodiment. The sixth embodiment is different from the first embodiment in that the power conversion control device 7 having a dimension L4 larger than a dimension L3 of the housing 1 is mounted. According to the sixth embodiment, when the outer dimension L4 of the power conversion control device 7 is larger than the dimension L3 of the housing 1, the fixing member 9 is hard to dispose while securing the distance to be larger than the outer dimension of the power conversion control device 7. By doing so, even in this case, it is effective for the vibration reduction of the power conversion control device 7 or the substrate 8 to dispose the fixing member 9 to be far from the bearing portion. Therefore, when the large power conversion control device 7 is mounted as in the sixth embodiment, it is effective for obtaining the effects of the present invention by disposing at least a part of the fixing member 9 in a pipe-shaped area having the inner diameter of L3 and the outer diameter of L4.

In the sixth embodiment, if the outer dimension of the cover 4 is larger than the outer dimension of the heat radiating fin 2, the outer dimension of the entire motor becomes large. To prevent the outer dimension of the motor from becoming large, it is desirable that the outer dimension of the cover 4 is equal to or smaller than the outer dimension of the heat radiating fin 2. For this purpose, it is necessary that the outer dimension of the power conversion control device 7 is equal to or smaller than the outer dimension of the heat radiating fin 2.

Seventh Embodiment

Figure 12A:
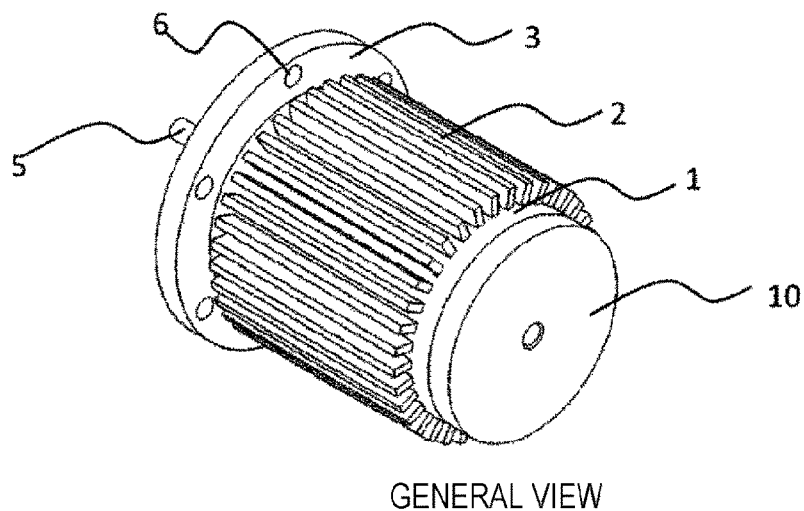
FIG. 12 is a view for explaining an electromechanical integral motor according to a seventh embodiment.
Figure 12B:
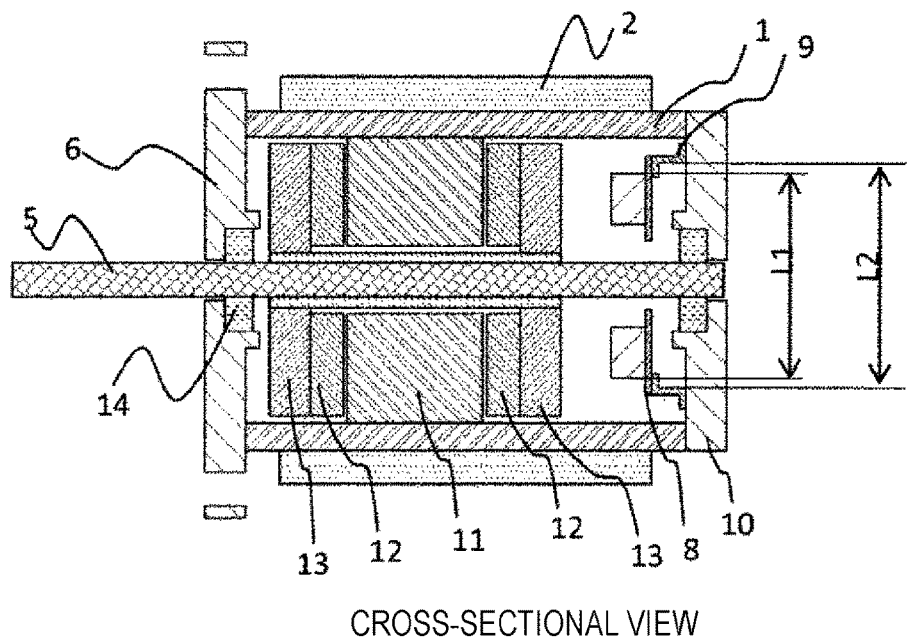
Figure 12C:
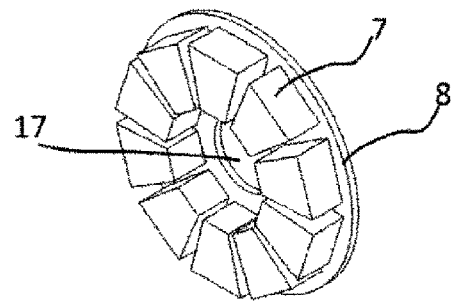

FIG. 12 shows a general view and a cross-sectional view of an electromechanical integral motor according to a seventh embodiment and a perspective view of the power conversion control device and the substrate. The seventh embodiment is different from the first embodiment in that the cover 4 is not provided and the power conversion control device 7 is disposed inside the anti-load side end bracket 10. Even in the seventh embodiment, the power conversion control device 7 or the substrate 8 is fixed to the anti-load side end bracket 10 so that the distance L2 between the fixing members 9 is larger than the outer dimension L1 of the power conversion control device 7, such that it is possible to protect the power conversion control device 7 or the substrate 8 from the vibration in the out-of-plane direction of the anti-load side end bracket 10. It should be noted that in the seventh embodiment, the shaft 5 penetrates through the center of the substrate 8. For this reason, the substrate 8 is provided with a shaft through hole 17, and the power conversion control device 7 needs to be disposed around the substrate 8 not to interfere with the shaft through hole 17.

Eighth Embodiment

Figure 13:
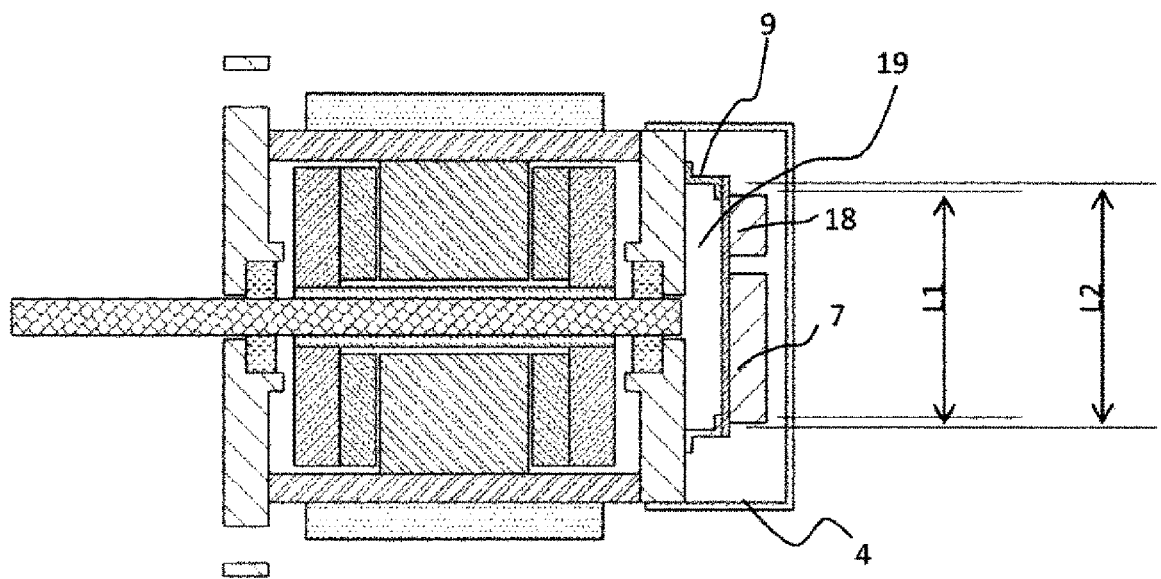
FIG. 13 is a view for explaining an electromechanical integral motor according to an eighth embodiment.

FIG. 13 shows a cross-sectional view of an electromechanical integral motor according to an eighth embodiment. The eighth embodiment is different from the first embodiment in that not only the power conversion control device 7 but also an auxiliary device 18 having other functions is mounted on the substrate 8. When the motor is used, by providing functions such as a sensor measuring temperature or vibration or a wireless module transmitting and receiving a signal, the applications of the motor can be expanded. At this time, the auxiliary device 18 such as the sensor and the wireless module has devices that need to be protected against vibration. At this time, it is possible to reduce the vibration of the power conversion control device 7 or the auxiliary device 18 by disposing the power conversion control device 7 or the auxiliary device 18 within the distance L2 between the fixing members 9 using the effects of the present invention. It should be noted that when components with sufficient resistance against vibration are mounted, the power conversion control device 7 or the auxiliary device 18 may be outside the distance L2 between the fixing members 9.

Hereinabove, while the present invention has been specifically described based on the embodiments, it is to be understood that the present invention is not limited to the above-described embodiments and various modifications can be made without departing from the spirit thereof.

REFERENCE SIGNS LIST

1 housing
2 heat radiating fin
3 load side end bracket
4 cover
5 shaft
6 bolt hole for fixing motor
7 power conversion control device
8 substrate
9 fixing member
10 anti-load side end bracket
11 coil
12 magnet
13 magnet support
14 bearing
15 heat radiating fin
16 leg for fixing motor
17 shaft through hole
18 auxiliary device
19 space
20 gap

The invention claimed is:

1. An electromechanical integral motor comprising an axial gap type motor and a power conversion control device, wherein
the power conversion control device is mounted on an anti-load side end bracket portion of the motor,
a space is provided between the anti-load side end bracket portion of the motor and the power conversion control device,
the anti-load side end bracket portion of the motor and the power conversion control device are fixed by a plurality of fixing members,
at least one set of the plurality of fixing members is disposed to be spaced apart from each other, and
the at least one set of the plurality of fixing members are disposed closer to an outer circumferential part of the motor such that a dimension of an innermost part of a contacting part of a fixing member of the at least one set that contacts with the anti-load side end bracket portion of the motor is larger than an outer dimension of the power conversion control device.

2. The electromechanical integral motor according to claim 1, wherein a material of the plurality of fixing members satisfies at least one of a smaller elastic modulus or a larger damping factor than a material of the anti-load side end bracket portion of the motor.

3. The electromechanical integral motor according to claim 1, wherein
a heat radiating fin is disposed in the space between the anti-load side end bracket portion of the motor and the power conversion control device, and
the power conversion control device is connected to the fin, and a space is disposed between the anti-load side end bracket portion of the motor and the fin.

4. The electromechanical integral motor according to claim 1, wherein the power conversion control device is disposed between a load side end bracket of the motor and the anti-load side end bracket portion of the motor.

5. The electromechanical integral motor according to claim 1, wherein an auxiliary device configured to sense or communicate information is mounted at a position at which the power conversion control device is mounted.

6. An electromechanical integral motor comprising an axial gap type motor and a power conversion control device, wherein
the power conversion control device is mounted on an end bracket portion of the motor,
a space is provided between the end bracket portion of the motor and the power conversion control device,
the end bracket portion of the motor and the power conversion control device are fixed by a plurality of fixing members, and
at least one set of the plurality of fixing members is disposed to be spaced apart from each other,
wherein at least a part of a fixing member of the at least one set is disposed in a pipe-shaped area in which an inner diameter is defined as an inner dimension of a housing portion of the motor and an outer diameter is defined as an outer dimension of the power conversion control device.

7. The electromechanical integral motor according to claim 6, wherein the outer dimension of the power conversion control device is equal to or less than an outer diameter of a heat radiating fin disposed on a surface of the motor.

* * * * *